UNITED STATES PATENT OFFICE.

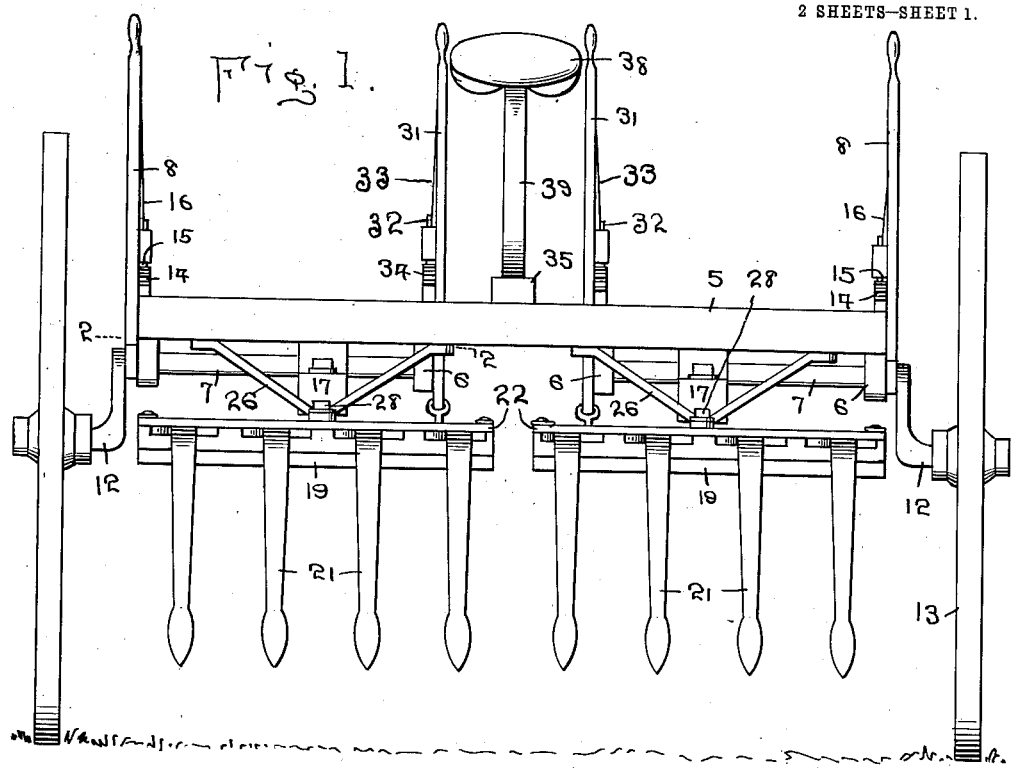
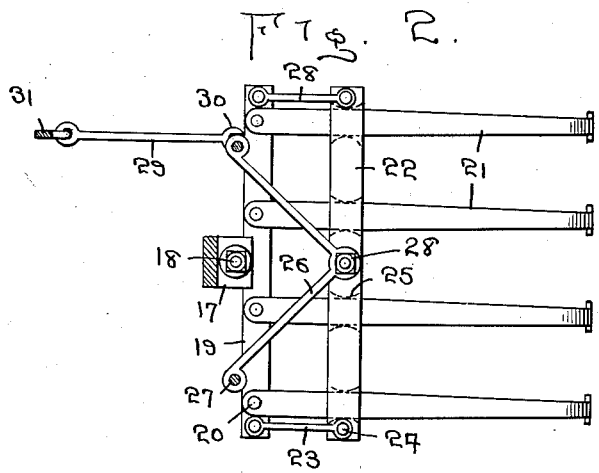

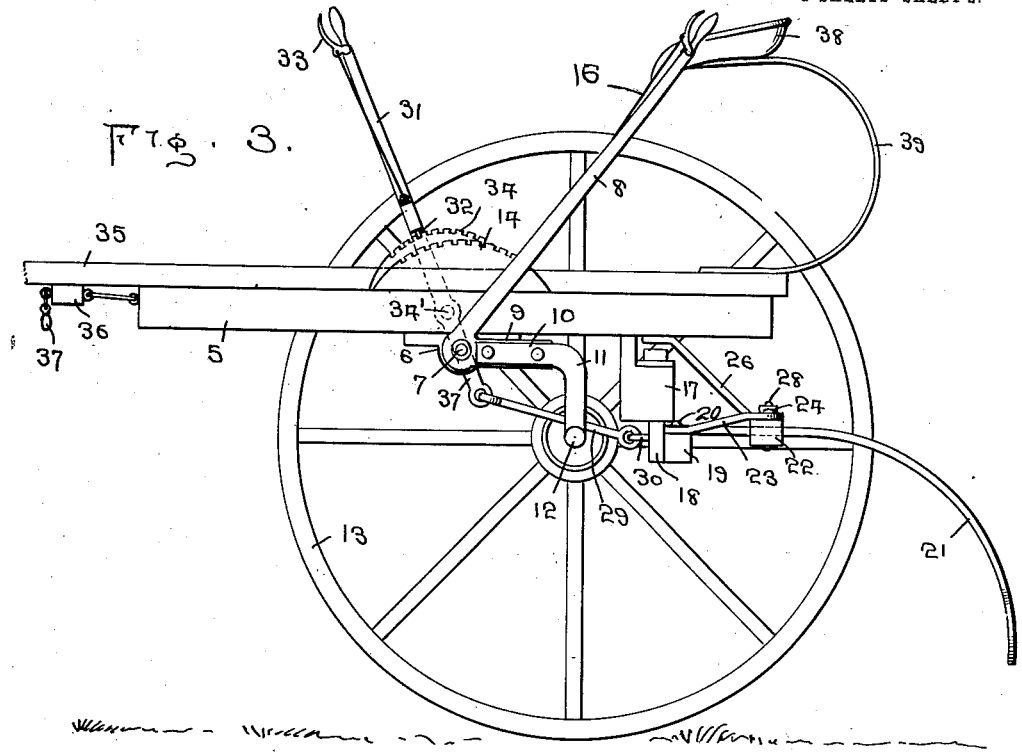
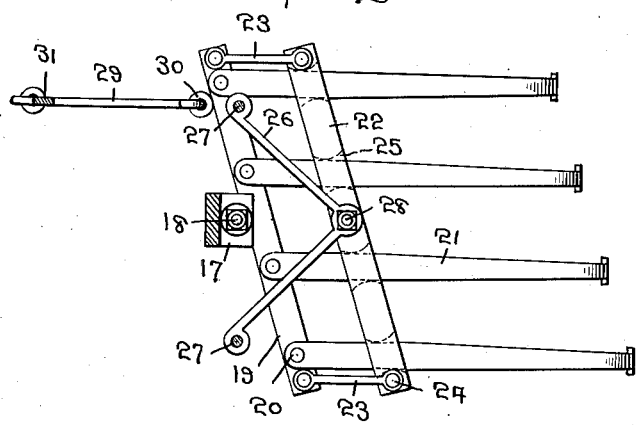

WILLIAM W. McARTHUR, OF BOSTIC, NORTH CAROLINA.

RIDING HARROW AND CULTIVATOR.

1,074,444. Specification of Letters Patent. Patented Sept. 30, 1913.

Application filed September 27, 1912. Serial No. 722,654.

*To all whom it may concern:*

Be it known that I, WILLIAM W. MCARTHUR, a citizen of the United States, residing at Bostic, in the county of Rutherford and State of North Carolina, have invented certain new and useful Improvements in Riding Harrows and Cultivators; and I do hereby declare the following to be a full, clear, and exact description of the invention, such as will enable others skilled in the art to which it appertains to make and use the same.

This invention relates to combined riding harrows and cultivators.

An object of the invention is to provide improved means whereby the cultivator or harrow blades may be quickly and easily set at any desired relation to each other.

Other objects and advantages may be recited hereinafter and in the claim.

In the accompanying drawings which form a part of this application, Figure 1 is a rear elevation view of my improved cultivating machine. Fig. 2 is a horizontal sectional view on the line 2—2 of Fig. 1. Fig. 3 is a side elevation view of the machine, the tongue being broken off and one wheel being removed, and, Fig. 4 is a view, similar to Fig. 2, showing one of the two sets of cultivator teeth or blades, in one of its alternative positions of adjustments.

Referring to the drawings, in which similar reference characters designate corresponding parts throughout the several views, I designate the main frame of the machine, as a whole, by the numeral 5. Bearings 6 are secured to and depend from the frame 5, and in these bearings are journaled axles 7, to the outer ends of which are secured the bell-crank levers 8 which are provided with rearwardly extending arms 9, and to these arms 9 are secured, by any proper means, the forward extensions 10 of the arms 11 which are formed integrally with the spindles 12 on which the ground wheels 13 are mounted; said ground wheels supporting the frame, through the medium of the axles 7 and its adjuncts.

Toothed segments 14 are secured to the frame, and the levers 8 are provided with latches 15, which are adapted to be actuated in known manner through the medium of rods 16.

Depending from the frame 5, between the middle and the respective sides thereof, are hangers or bearings 17 in each of which is journaled a vertical stub axle 18, carrying a horizontal beam 19, to which is pivoted, at 20, a set or series of cultivator blades or harrow teeth 21, which are preferably formed from spring steel or other suitable metal. The beam 22 is pivotally connected in parallel relation to the beam 19, through the medium of links 23 and bolts or other suitable pivots 24, through the ends of the respective links and beams. The beam 22 is apertured at 25 for the reception of the teeth or cultivator members 21 which extend therethrough, the apertures being flared or widened from their middle portion outwardly, so that the respective beams and teeth may be shifted into any of their alternative positions, as illustrated in Fig. 4. This beam 22 retains the harrow teeth in approximately parallel position both vertically and horizontally, in all of their alternative positions.

A bracket 26 is secured to the frame 5 by means of bolts 27, and this bracket is substantially V-shaped and is pivotally connected to the upper middle portion of the beam 22, by means of a bolt or other pivot 28. By means of this bracket, the beam 22 is held against lateral movement, and thus coöperates with the hanger 17 and its adjuncts for retaining the teeth 21 in parallel relation to the line of travel of the machine. The bracket 26 also supports the beam 22 in its properly elevated position, for supporting the teeth 21, and also, for holding them against the tendency to be unduly raised by the action of the ground which is being cultivated.

A link 29 is pivotally connected to the beam 19, adjacent to the inner end thereof, by any proper means, such as an eye bolt 30, and to the forward end of this link is pivotally connected a hand lever 31, provided with a latch 32 and latch operating means 33. A toothed segment 34 is secured on the frame and is adapted to engage the latch 32 for holding the lever 31 in any of its alternative positions; said lever being pivoted at 34' and being adapted, through the medium of the link 29, for shifting the teeth 21, as previously described, and as shown in Fig. 4.

Experience has proven that vegetable matter such as grass, weeds, etc., when allowed to remain and decay upon the surface of the soil, is advantageous thereto, for enriching the soil and for retaining moisture therein; therefore it is an object of this invention to thoroughly pulverize the plowed ground without denuding it of vegetable matter. This may be accomplished, to a great extent, by shifting the harrow teeth alternately backward and forward (as described), and thereby disengaging accumulations of vegetable matter, without raising the harrow teeth from their operative position. However, there are certain classes of weeds, grasses and other vegetable matter which it is desirable to remove from the ground, and to burn, and I provide for removing such undesirable matter, by allowing the teeth 21 to remain in the best position for accumulating the same, and when a considerable quantity has been accumulated, I can quickly manipulate the levers 8, so as to raise the teeth 21, so that they will pass from the pile of accumulated vegetable matter; whereupon, the frame and teeth may be easily lowered into working position.

It sometimes occurs that a rock, stump, bush or other obstruction is located in the line of travel of the harrow, and which it is desirable to avoid without changing the course of the machine. When such is the case, I may operate one of the levers 8, so as to raise one side of the frame and so that the teeth 21 of that side will pass over the obstacle, while the teeth of the opposite side will remain in contact with the ground.

The teeth 21, as shown, may be used either for harrowing or cultivating, but obviously, I may employ teeth of different forms, according to the nature of the work to be accomplished. In order to remove the teeth 21 and replace them by other teeth, it is only necessary to disconnect them from the bolts or pivots 20, whereupon they may be withdrawn through the apertures 25, and thereafter such other teeth as desired can be quickly substituted therefor.

Any proper form of draft appliance, such as a tongue 35, double-tree 36 and swingle-tree 37 may be employed for hitching the draft animals thereto.

A driver's seat 38 is mounted upon a spring 39, and from this seat, the levers 8 and 31 may be easily reached and operated.

It may be seen that I have provided a device of this character which is fully capable of attaining the foregoing objects, and in a thoroughly practical and efficient manner.

I do not limit my invention to the exact details of construction, combination and arrangement of parts as illustrated and described in the foregoing, but my invention may only be limited by a reasonable interpretation of the following claim.

I claim:

In a machine of the character described, a frame, a beam pivotally supported by the frame and adapted to be swung horizontally, a series of cultivator members pivoted to the beam, a second beam pivotally connected with the first said beam and coacting therewith for supporting the cultivator members, a bracket secured to the frame, a pivotal element connecting the bracket with the middle portion of the said second beam, and means associated with the first said beam whereby it may be swung on its pivotal support, for changing the relative positions of the cultivator members.

In testimony whereof I have signed my name to this specification in the presence of two subscribing witnesses.

WILLIAM W. McARTHUR.

Witnesses:
J. A. MARTIN,
LEE PHILBECK.